US012448830B2

(12) United States Patent
Lee et al.

(10) Patent No.: US 12,448,830 B2
(45) Date of Patent: Oct. 21, 2025

(54) DOOR HINGE

(71) Applicant: SEO WON KOREA CO., LTD, Gimhae-si (KR)

(72) Inventors: June Young Lee, Busan (KR); Sang Baek Kim, Gimhae-si (KR); Kyoung Rok Kim, Busan (KR)

(73) Assignee: SEO WON KOREA CO., LTD. (KR)

( * ) Notice: Subject to any disclaimer, the term of this patent is extended or adjusted under 35 U.S.C. 154(b) by 64 days.

(21) Appl. No.: 18/544,665

(22) Filed: Dec. 19, 2023

(65) Prior Publication Data

US 2024/0117663 A1 Apr. 11, 2024

Related U.S. Application Data

(63) Continuation of application No. PCT/KR2022/004879, filed on Apr. 5, 2022.

(30) Foreign Application Priority Data

Nov. 15, 2021 (KR) ........................ 10-2021-0156552

(51) Int. Cl.

| | |
|---|---|
| ***E05F 1/08*** | (2006.01) |
| ***E05F 1/12*** | (2006.01) |
| ***E05F 1/14*** | (2006.01) |
| ***E05F 3/04*** | (2006.01) |

(52) U.S. Cl.

CPC .............. *E05F 1/14* (2013.01); *E05F 1/1253* (2013.01); *E05F 3/04* (2013.01); *E05Y 2201/10* (2013.01);

(Continued)

(58) Field of Classification Search

CPC ... F16F 15/03; F16F 6/00; F16F 6/005; F24C 15/02; F24C 15/023; E05F 1/1276;

(Continued)

(56) References Cited

U.S. PATENT DOCUMENTS

2007/0283532 A1* 12/2007 Vanini .................. F24C 15/023 16/277
2016/0348919 A1* 12/2016 Ivanovic ............... E05F 1/1246

(Continued)

FOREIGN PATENT DOCUMENTS

CN 208416238 U * 1/2019
EP 1847670 B1 11/2009

(Continued)

OTHER PUBLICATIONS

International Search Report (PCT/KR2022/004879), WIPO, Feb. 16, 2023.

(Continued)

*Primary Examiner* — Chuck Y Mah

(74) *Attorney, Agent, or Firm* — Park & Associates IP Law Office

(57) ABSTRACT

Proposed is a door hinge that includes an arm installed on a door, a housing installed in a main body of a mechanism provided with a door and connected to the arm by a hinge shaft, a damper casing connected to the arm inside the housing by the hinge shaft and having one surface supported by a support portion of the housing, a pair of main links connected to the arm inside the housing by a link shaft to linearly move, a main spring assembly including a spring lever and a main spring inserted into the spring lever, and a damper provided inside the damper casing and moving along the periphery of the arm.

5 Claims, 8 Drawing Sheets

(52) U.S. Cl.
CPC ... *E05Y 2201/256* (2013.01); *E05Y 2201/264* (2013.01); *E05Y 2201/624* (2013.01); *E05Y 2201/638* (2013.01); *E05Y 2201/686* (2013.01)

(58) Field of Classification Search
CPC ..... E05F 1/1292; E05F 1/1261; E05F 1/1253; E05F 1/14; E05F 3/04; E05Y 2201/10; E05Y 2201/256; E05Y 2201/264; E05Y 2201/624; E05Y 2201/638; E05Y 2201/686; E05Y 2201/41; E05Y 2201/412; E05Y 2201/414; E05Y 2201/416; E05Y 2201/40; E05Y 2201/46; E05Y 2900/308; E05D 11/1064; E05D 16/286
See application file for complete search history.

(56) References Cited

U.S. PATENT DOCUMENTS

| | | | | |
|---|---|---|---|---|
| 2018/0073291 | A1 * | 3/2018 | Vanini | E05F 3/20 |
| 2019/0353353 | A1 | 11/2019 | White et al. | |

FOREIGN PATENT DOCUMENTS

| | | | | | |
|---|---|---|---|---|---|
| EP | 2687786 | A2 | * | 1/2014 | E05F 1/1276 |
| EP | 2977537 | A1 | | 1/2016 | |
| EP | 3088648 | A1 | | 11/2016 | |
| KR | 1020110125727 | A | | 11/2011 | |
| KR | 1020120019787 | A | | 3/2012 | |
| KR | 101193477 | B1 | * | 10/2012 | |
| KR | 1020190076238 | A | | 7/2019 | |
| KR | 1020190118924 | A | | 10/2019 | |
| WO | 2020234198 | A1 | | 11/2020 | |

OTHER PUBLICATIONS

Korean Notice of Allowance (KR 10-2021-0156552), KIPO, Mar. 8, 2023.

Extended European Search Report (EP 22892952.7), EPO, Sep. 30, 2024.

* cited by examiner

DOOR HINGE

REFERENCE TO RELATED APPLICATIONS

This is a continuation of International Patent Application PCT/KR2022/004879 filed on Apr. 5, 2022, which designates the United States and claims priority of Korean Patent Application No. 1 0-2021-01 56552 filed on Nov. 15, 2021, the entire contents of which are incorporated herein by reference.

FIELD OF THE INVENTION

The present disclosure relates to a door hinge and, more particularly, to a door hinge that allows a door to be opened or closed smoothly by a damper during the opening or closing operation of the door and facilitates opening of the door with a small amount of force.

BACKGROUND OF THE INVENTION

In general, a door used in kitchen furniture such as cupboard doors, used in various electronic products such as refrigerators for kimchi and washing machines, or used in folder-type mobile phones mainly uses a bottom-up hinged door that opens up and closes down while rotating around a hinge shaft.

A hinge device used in such a bottom-up hinged door rotates and performs a closing operation of a door in a state while being mounted at the end of a door.

Meanwhile, a compression spring is built into such a door hinge and the compression spring generates a compression force at the start section where the closing operation of a door is performed and slows down the rotation speed of the shaft, so that the door can rotate slowly.

However, the compression force which a compression spring has is limited, and when the compression spring is configured to support the load of the door with only one compression spring as conventionally used, the compression spring cannot generate a compression force sufficient to support the door load when entering the progress section where the closing operation of a door continues, so it has a disadvantage of not being able to effectively slow down the rotation speed of the shaft.

Due to this disadvantage, the door closes at a high speed when entering the progress section for closing the door and hits a mechanism, thereby shortening the service life of the mechanism by damaging various electronic accessories due to the impact transmitted to the mechanism along with causing various safety accidents.

SUMMARY OF THE INVENTION

The present disclosure has been devised to solve the above problems, and an objective of the present disclosure is to provide a door hinge capable of facilitating the opening and closing of a door.

Further, the objective is to provide a door hinge that allows the door to be opened and closed smoothly by a damper.

In addition, the objective is to provide a door hinge that enables a door to be opened and closed with a small amount of force by allowing the link shaft to move and rotate within a hole centering on the hinge shaft when the door is rotated.

Further, the objective is to provide a door hinge that keeps the door from being opened due to the heat from high temperatures inside a main body.

Along with this, other objectives and advantages of the present disclosure will be explained below, which will be covered in a wider range not only by the matters described in the claims of the present disclosure and the exemplary embodiments thereof, but also by means and combinations within the scope that can be easily deduced from these.

A door hinge of the present disclosure to achieve the objectives includes an arm installed on a door so as to pivot, a housing installed on a main body of a mechanism in which the door is provided, the housing being connected to the arm by a hinge shaft and having a first and a second openings provided in one side portion and a center portion thereof, a damper casing connected to the arm by the hinge shaft inside the housing, the damper casing having a third and a fourth openings provided in one side portion and the other side portion thereof, and being connected to the second opening in the third opening by a rivet, and having one surface supported by a support portion of the housing, a pair of main links provided respectively on opposite sides of the damper casing inside the housing, the main links being connected to the arm by a link shaft, and having a fifth and a sixth openings provided in one side portion thereof, and being connected to the second and the third openings by the rivet in the six opening to linearly move, a main spring assembly including a spring lever and a main spring inserted into the spring lever and being connected to the third and the fifth openings by a pin and a damper provided inside the damper casing, one side of which is supported by the rivet, and the other side of which is connected to the fourth opening by a pin to move along the periphery of the arm, wherein when the door is opened the main links move linearly and the damper is compressed by the movement of the rivet and when the door is closed the periphery of the arm is in contact with the other side portion of the damper by the pivoting of the arm so that the damper is compressed.

According to a preferred exemplary embodiment of the present disclosure, the arm may further include a link hole into which the link shaft is inserted, and the link hole may be formed in a long circular shape in an inward direction centering on the hinge shaft such that when the door is rotated, the link shaft moves along the link hole, and when the door is opened, the link shaft moves from one side portion to the other side portion of the link hole so that the door is smoothly opened, and when the door is closed, the link shaft moves from the other side portion to one side portion of the link hole so that the door is smoothly closed.

In addition, according to a preferred exemplary embodiment of the present disclosure, the damper may include a body, a head that is supported by the rivet while moving in piston motion on one side portion of the body, a damper cover provided on the other side portion of the body, and a roller that is provided in the damper cover and is configured to move along the periphery of the arm.

Further, according to a preferred exemplary embodiment of the present disclosure, a cam profile formed on the arm may include a dent portion formed on the periphery of the arm in contact with the roller of the damper, a curved portion formed to be extended from the dent portion, and a flat portion formed to be extended from the curved portion.

In addition, according to a preferred exemplary embodiment of the present disclosure, a sub-spring assembly is further provided inside of the housing and is connected by a pin to the fourth opening provided on the other side portion of the housing to linearly move, one side portion of which is supported by a sub-support portion inside the housing, wherein the sub-spring assembly may include a rod, a sub-spring inserted into the rod, and a sub-roller provided on the other side portion of the rod, and the sub-roller is inserted into the dent portion when the door is closed.

As described above, the following effects may be expected in accordance with the present disclosure.

First, in addition to facilitating the opening and closing of a door, there may be an effect that the door is opened and closed stably by enabling the door to open and close smoothly by the compression force of the damper.

Further, when the link shaft rotates by the rotation of a door, the link shaft may move and rotate inside a hole centering on the hinge shaft so there may be an effect of opening and closing the door even with a small amount of force. That is, when the door is opened, the link shaft may be far from the hinge shaft as a pivot, so that the door is easily opened even when a user applies a small amount of force, and when the door is closed, the link shaft may be close to the hinge shaft, so that the door may be easily closed even when a user applies a small amount of force.

In addition, the problem of a door being opened due to the heat from high temperatures inside of a main body may be solved. That is, a sub-spring portion provided inside the housing may be inserted into the dent portion of the arm such that a door may be opened only when a user exerts a force at the moment when the door is first opened.

With this, it is added that other effects of the present disclosure will be covered to a wider extent by the exemplary embodiments described above and the claims of the present disclosure as well as by the possibilities of effects that may occur within the easily inferred scope and potential advantages contributing to industrial development.

DETAILED DESCRIPTION OF THE INVENTION

Hereinafter, preferred exemplary embodiments of the present disclosure will be described in detail with reference to the accompanying drawings. Before the description, the advantages and features of the present disclosure and a method of achieving them will become apparent with reference to the exemplary embodiments described below in detail along with the accompanying drawings. In addition, the terms used in this specification are intended to describe exemplary embodiments and are not intended to limit the present disclosure, and among these terms, the singular form includes the plural form unless specifically mentioned in the context.

Figure 1A:
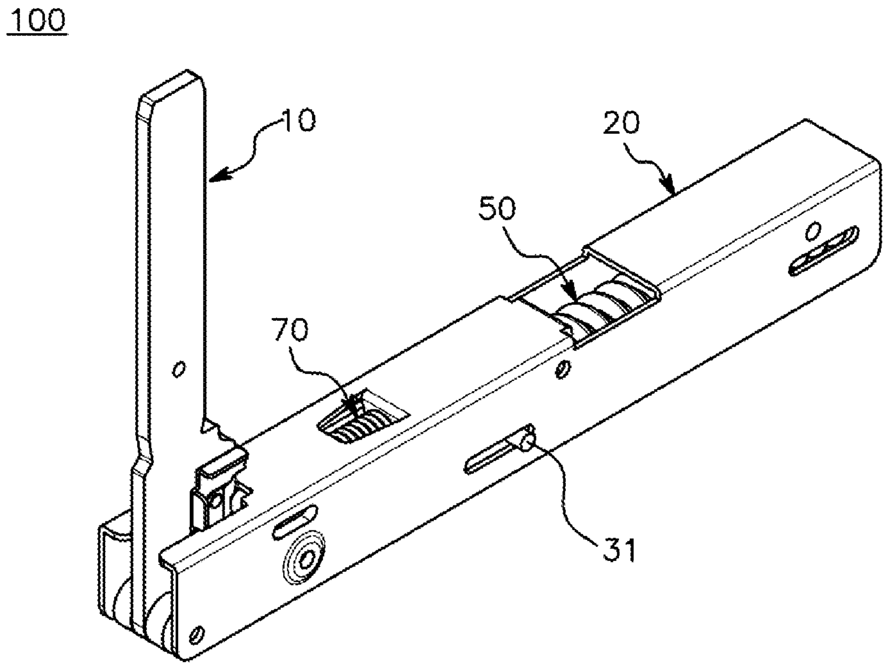
FIGS. 1*a* and 1*b* are a perspective view and an exploded perspective view showing a door hinge according to the present disclosure.

Hereinafter, a door hinge according to a preferred exemplary embodiment of the present disclosure will be described in detail with reference to the accompanying drawings. FIG. 1*a* is a perspective view showing a door hinge according to the present disclosure, and FIG. 1*b* is an exploded perspective view showing a door hinge according to the present disclosure.

Figure 1B:
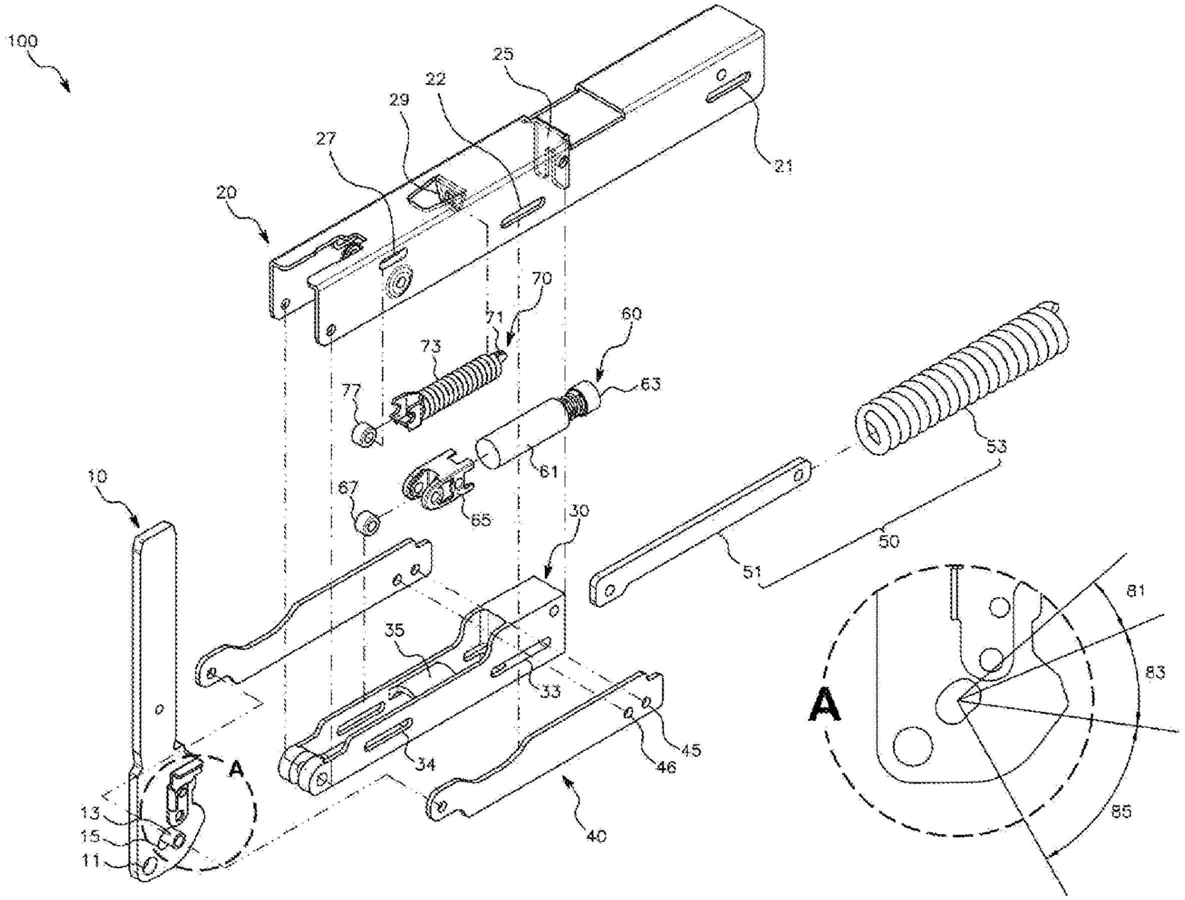

Referring to FIGS. 1*a* and 1*b*, a door hinge 100 according to the present disclosure may include an arm 10, a housing 20, a damper casing 30, main links 40, a main spring assembly 50, a damper 60, and a sub spring assembly 70.

First, the arm 10 may be installed on a door, the other side portion of which is connected to the housing 20 described below, and the arm 10 may pivot together when the door rotates.

In this arm 10, a cam profile may be formed at a portion in contact with a roller 67 of the damper 60 described below and a roller 77 of the sub-spring assembly 70 and the cam profile may be composed of a dent portion 81, a curved portion 83, and a flat portion 85 as shown in FIG. 1*b* with A enlarged.

Herein, the dent portion 81 may be a curvedly dent shape so that the sub-spring assembly 70 is inserted, the curved portion 83 may be formed to be extended from the dent portion 81 and the flat part 85 may be formed to be extended from the curved portion 83, wherein the curved portion 83 is a curvedly protruding shape.

Likewise, the damper 60 and the sub-spring assembly 70 to be described below may come into contact with the periphery of the arm 10 on which such a cam profile is formed, which will be described in detail in the operation description of the door hinge 100 according to the present exemplary embodiment.

Meanwhile, the arm 10 may be provided with a hinge hole into which the hinge shaft 11 is inserted and a link hole 15 into which the link shaft 13 is inserted and in the case of the link hole 15, one side portion may be formed in a long circular shape radiated toward the inward direction centering on the hinge shaft 11, that is, toward the right direction centering on the drawing, facilitating the opening and closing of the door with a small amount of force when the door is opened and closed.

In detail, when trying to open a door in a state where the door is closed, the door may be supported on one side portion by the main spring 53 and the link shaft 13 may be far from the hinge shaft 11 within the link hole 15, that is, in one side portion of the link hole 15, so there may be an effect that the door is smoothly opened with a small amount of force at the moment when the door is opened.

On the other hand, when trying to close a door in a state where the door is opened, a main spring 53 may be stretched to the maximum, and the link shaft 13 may be close to the hinge shaft 11 within the link hole 15, that is, in the other side portion of the link hole 15, so there may be an effect that the door is smoothly closed with a small amount of force.

Next, a housing 20 may be installed on the main body of a mechanism in which a door is provided, and may be connected to the arm 10 by a hinge shaft 11. This housing 20 may include a first opening 21 provided on one side portion, a second opening 22 provided on the center portion, and a seventh opening 27 provided on the other side portion, and further may include a support portion 25 provided in order to be in contact with one side portion of the damper casing 30 and a sub-support portion 29 provided in order to be in contact with one side portion of the sub-spring assembly 70 inside of the housing 20.

More specifically, the first and the second openings 21 and 22 may be provided in a long circular shape in the longitudinal direction in order to enable a straight line motion of the pins connected to each opening 21 and 22, and the first opening 21 is connected by a provided pin to one side portion of the main spring assembly 50 described below and the second opening 22 may be connected by a provided rivet

31 to a third opening 33 of the damper casing 30 and a sixth opening 46 of the main links 40.

Further, the seventh opening 27 may be provided in a long circular shape in the longitudinal direction in order to enable a straight-line motion of a pin, wherein the seventh opening 27 is connected by the pin that is inserted into the sub-roller 77 of the sub-spring assembly 70 to be described below.

In addition, the support portion 25 may be provided to be extended from the center portion of the housing 20 into the interior of the housing 20 and, centering on the support portion 25, the damper casing 30 may be supported on the other side portion while the main spring 53 of the main spring assembly 50 is supported on one side portion.

Further, the sub-support portion 29 is provided to be extended from the other side portion of the housing 20 into the interior of the housing 20 and one side portion of the sub-spring assembly 70 is supported.

Next, the damper casing 30 may be provided inside the housing 20 and may have a damper 60 inside, wherein one surface is in contact with the support portion 25 of the housing 20 and the other side portion is connected to the arm 10 by the hinge shaft 11.

The damper casing 30 may include a third and a fourth openings 33 and 34 provided at one side portion and the other side portion, respectively.

Herein, the third opening 33 may be connected to the second opening 22 of the housing 20 and the sixth opening 46 of the main links 40 by the rivet 31 and through this connection, the damper casing 30 may be fixed without moving inside the housing 20, that is, between the support portion 25 and the hinge shaft 11.

Further, the head 63 of the damper 60 may be supported by the rivet 31 connected to the third opening 33 and the damper cover 65 of the damper 60 may be connected by a pin that is connected to the fourth opening 34 so the damper 60 may be provided inside the damper casing 30.

Meanwhile, when a door rotates, the damper 60 may move linearly according to the linear motion of the rivet 31, so that the head 63 of the damper 60 may be compressed by the rivet 31 and a cover 35 surrounding the damper 60 may be further provided inside the damper casing 30 so that the damper 60 may remain stable even when the damper 60 is compressed by the rivet 31.

Next, the main links 40 may be provided in pairs on opposite sides of the damper casing 30 inside the housing 20, and may be connected to the arm 10 by the link shaft 13 at the other side portion.

The main links 40 may be provided with a fifth and a sixth openings 45 and 46 on one side portion, wherein the fifth opening 45 is connected by a pin to the main spring assembly 50 to be described below and the sixth opening 46 is connected by a rivet 31 together to the second opening 22 of the housing 20 and the third opening 33 of the damper casing 30 as described above, so that the main links 40 may move linearly according to the rotation of a door.

Next, the main spring assembly 50 may be provided inside the housing 20, wherein one side portion is connected by a pin to the first opening 21 of the housing 20 and the other side portion is connected to the third opening 33 of the damper casing 30 and the fifth opening 45 of the main links 40 by a pin. Such a main spring assembly 50 may be provided to stabilize the opening and closing motion of the door.

Further, the main spring assembly 50 may be composed of a spring lever 51 and a main spring 53 inserted into the spring lever 51. Herein, the spring lever 51 may be connected to the main links 40 by a pin at the other side portion and may move linearly along with the main links 40 when the door rotates.

In addition, the main spring 53 may exert the compression forces according to a straight line motion of the spring lever 51, for example, a motion of moving toward the other side portion, wherein one side portion is supported by a pin provided on one side portion of the main spring assembly 50 and the other side portion is supported by the support portion 25 of the housing 20, resiliently supporting the opening or closing motion of a door through the compression force of the main spring 53.

Next, the damper 60 may be provided inside the damper casing 30, wherein one side portion of the damper 60 is provided to be in contact with the rivet 31 inside the damper casing 30 and the other side portion may be connected to the fourth opening 34 of the damper casing 30 by a pin.

That is, the damper 60 may include a body 61, a head 63 supported by a rivet 31 that crosses the inside of the damper casing 30 while moving in piston motion on one side portion of the body 61, a damper cover 65 provided on the other side portion of the body 61, and a roller 67 that is provided in the damper cover 65 and moves along a cam profile formed on the periphery of the arm 10, that is, the periphery of the arm 10.

Herein, the roller 67 provided on the other side portion of the damper 60 may be provided on the flat portion 85 extended from the curved portion 83 of the arm 10 when the closing of a door is finished, may be slowly rotated along the flat portion 85 when the opening and closing operation of a door proceeds, and may be provided at a position spaced apart as much as a predetermined distance from the arm 10 when the door is fully opened.

That is, when the door is opened, the arm 10 may pivot centering on the hinge shaft 11, but the damper casing 30 may not move, so the roller 67 of the damper 60 may be spaced apart as much as a predetermined distance from the arm 10 due to the shape of the cam profile of the arm 10.

At this time, although the damper casing 30 may not move, the main links 40 may move linearly when the arm 10 pivots, so that compression may begin while the head 63 of the damper 60 is pressed by the rivet 31 and then the opening and closing of a door is gradually performed.

Meanwhile, the damper 60 may be filled with fluid inside the body 61 and when a door is opened or closed while the head 63 of the damper 60 is supported by the rivet 31 due to a straight line motion of the main links 40 the resistance force by the fluid filling inside the body 61 may act, resulting in damping and the door is gradually opened or closed.

Next, the sub-spring assembly 70 provided inside the housing 20 may be connected to the seventh opening 27 of the housing 20 by a pin to move linearly and one side portion may be supported by the sub-support portion 29 inside the housing 20.

This sub-spring assembly 70 may include a rod 71, a sub-spring 73 inserted to the rod 71, and a sub-roller 77 provided on the other side portion of the rod 71. Herein, the sub-spring 73 may be inserted into the rod 71, with one side portion being in contact with the sub-support portion 29 and the other side portion being in contact with the bracket equipped with the sub-roller 77 and the compression force may be exerted according to the opening and closing of a door, resiliently supporting operations of a door by enabling the sub-roller 77 to be inserted into or separated from the dent portion 81.

Further, a sub-roller 77 may be rotatably provided on the other side portion of the rod 71, so that the sub-roller 77 may easily move along the dent portion 81 and the curved portion 83, that is, the cam profile formed on the periphery of the arm 10.

For this reason, when the closing of a door is finished, the sub-roller 77 may be inserted into the dent portion 81 of the arm 10 and may support the door not to be opened due to the heat from high temperatures inside of the main body. And when trying to open a door, the user should open the door with a small amount of force in order to separate the sub-spring member 70 from being inserted into the dent portion 81.

Figure 2A:
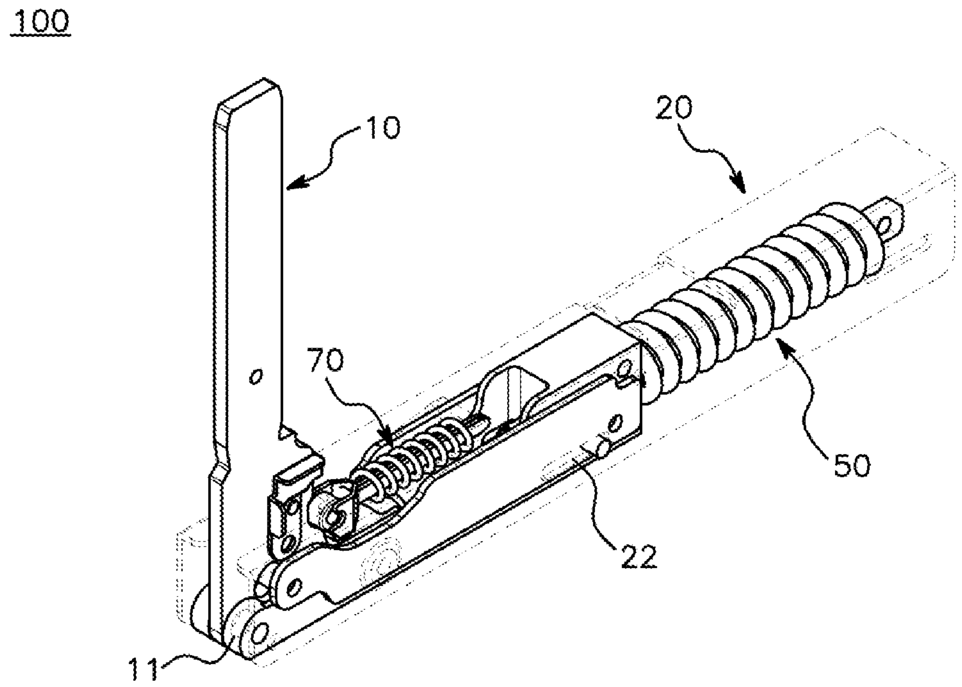
FIGS. 2*a* and 2*b* are views showing a closed state of a door hinge according to the present disclosure.
Figure 2B:
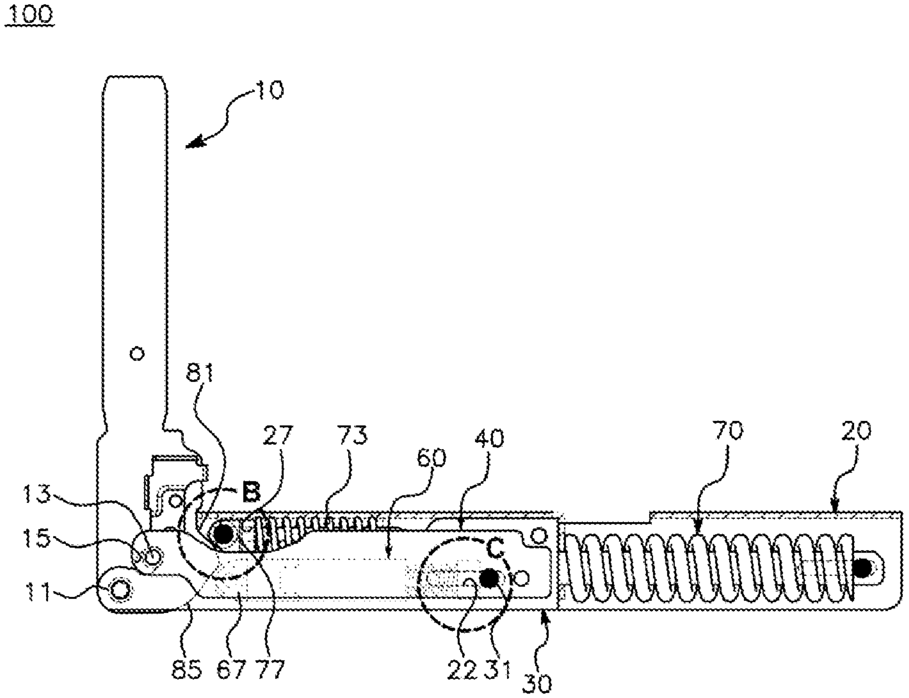

An operation process of a door hinge according to the present disclosure will be described on the basis of the description above. FIGS. 2*a* and 2*b* are views showing a closed state of a door hinge according to the present disclosure, FIGS. 3*a* and 3*b* are views showing a state in which a door hinge according to the present disclosure is in an open or closed operation and FIGS. 4*a* and 4*b* are views showing an open state of the door hinge according to the present disclosure.

First, when examining the closed state of a door with reference to FIGS. 2*a* and 2*b*, the sub-spring assembly 70 which is inserted into the dent portion 81 of the arm 10 as shown in B may support the door not to be opened due to the heat from high temperatures inside of the main body. Herein, the sub-spring assembly 70 may be in a state in which the sub-spring 73 is not compressed and a pin is provided at the other end of the seventh opening 27 of the housing 20 as shown in B.

Further, the arm 10 may maintain 0° from the main body centering on the hinge shaft 11 whereby the sub-spring assembly 70 is inserted into the dent portion 81, the damper 60 is provided with the roller 67 of the other side portion in contact with the flat portion 85 of the arm 10, one surface like C is provided to be in contact with the rivet 31, the main links 40 are in a standby state and the rivet 31 is provided at one end of the second opening 22, so that the damper 60 and the main spring assembly 50 may be in a decompressed state.

Figure 3A:
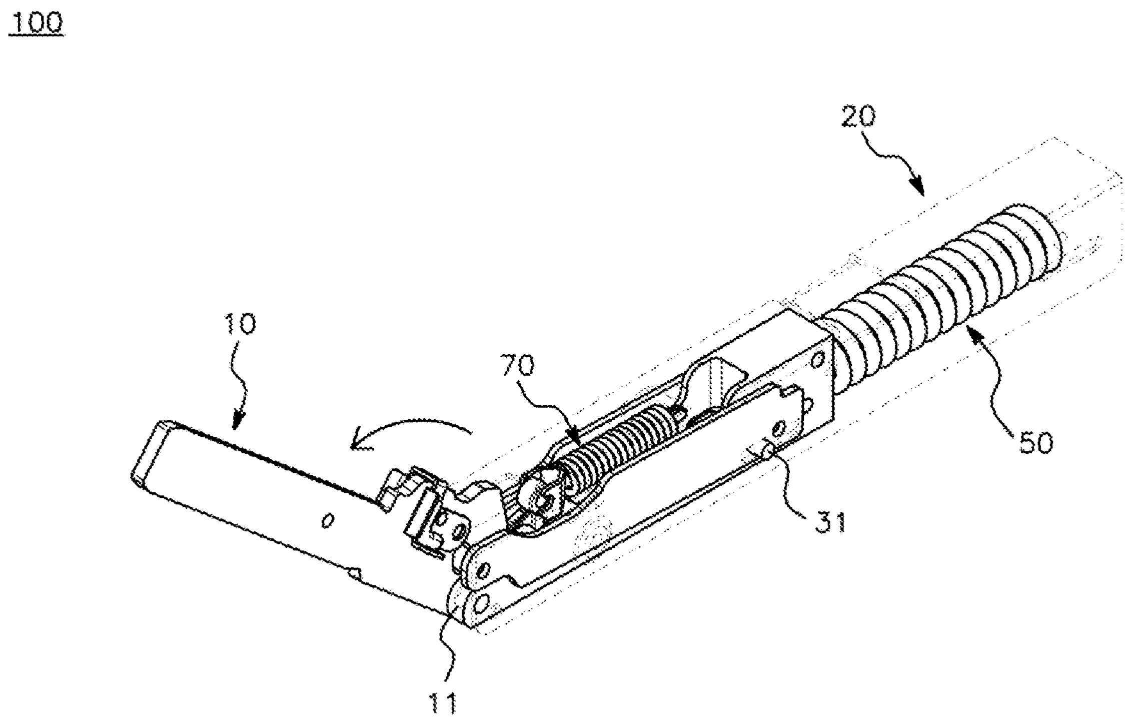
FIGS. 3*a* and 3*b* are views showing a state in which a door hinge is in an opening or closing operation according to the present disclosure.
Figure 3B:
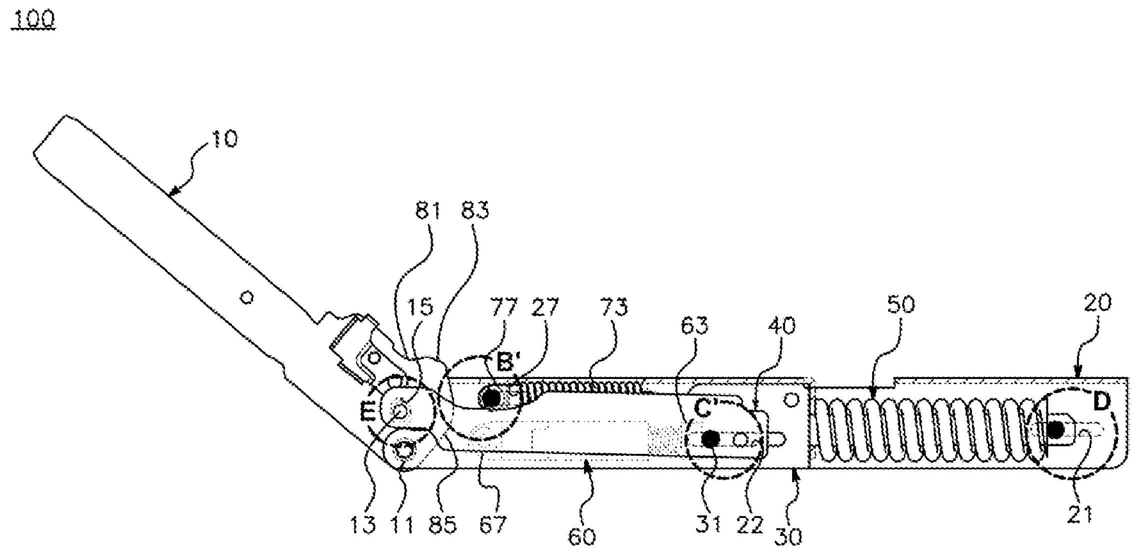
Figure 4A:
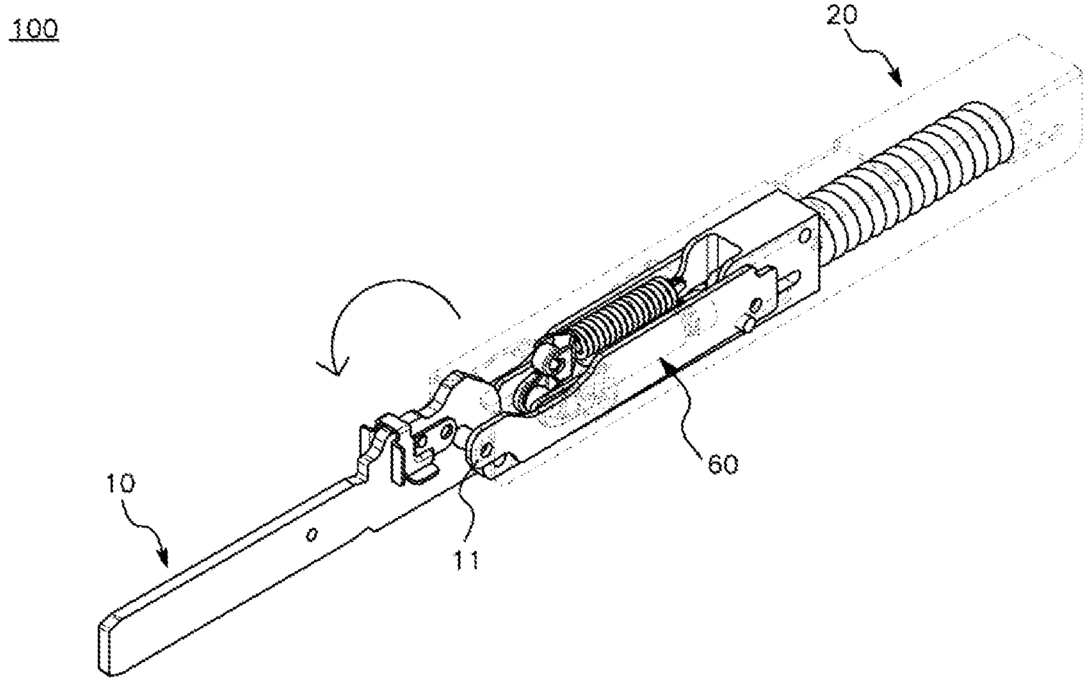
FIGS. 4*a* and 4*b* are views showing an open state of a door hinge according to the present disclosure.
Figure 4B:
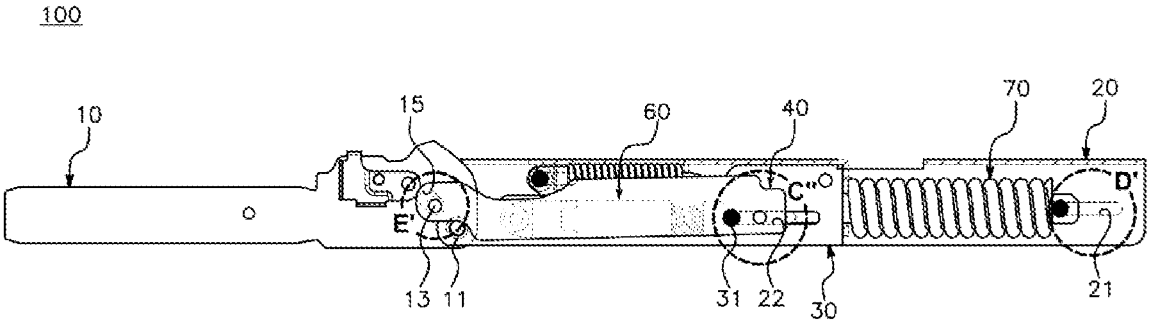

Subsequently, in the case of opening a door as shown in FIGS. 3*a* and 3*b*, the sub-spring assembly 70 may be separated from the dent portion 81 as shown in B' while the door is opened by the force of a user, the arm 10 pivots centering on the hinge shaft 11 like an arrow in FIG. 3*a*, the roller 67 of the damper 60 moves gradually from the curved portion 83 to the flat portion 85, and the main links 40 move linearly to the other side portion, that is, to the left based on FIG. 3*b* according to the rotation of the link shaft 13, and the rivet 31 moves linearly to the other side portion along the second opening 22 as shown in C', whereby the head 63 of the damper 60 is supported by the rivet 31 and starts to be compressed. At this time, the main spring assembly 50 connected to the main links 40 may also move linearly and a pin moves linearly to the other side portion along the first opening 21 like D.

Herein, when the arm 10 pivots, the link shaft 13 may move slowly along the link hole 15 like E and the pin of the sub-spring assembly 70 may also move to one side portion along the seventh opening 27 like B', generating a compression force in the sub-spring assembly 70.

Likewise, as shown in FIG. 2*b*, the link shaft 13 within the link hole 15 may be as far away as possible from the hinge shaft 11 as a pivot, that is, at a long distance away centering on the hinge shaft 11 in a closed state of a door, so there may be an effect of allowing a user to easily rotate the door with a small amount of force.

Meanwhile, when the door opens at an angle of about 20 to 40°, the damper 50 may start to be compressed, and the doors in FIGS. 3*a* and 3*b* may show a state in which the opening angle is about 30 to 60°.

Then, as shown in FIGS. 4*a* and 4*b*, when the door is completely opened, the arm 10 may be completely rotated by the hinge shaft 11 like the arrow in FIG. 4*b*, and the main links 40 may be completely moved to the other direction by the link shaft 13 as shown in FIG. 4*b*.

With this movement of the main links 40, the rivet 31 may move linearly to the other end along the second opening 22 as shown in C'' and by this rivet 31 the head 63 of the damper 60 may be supported and is compressed to the maximum, at which time the pin of the main spring assembly 50 is also moved linearly to the other end along the first opening 21 as shown in D'.

When the arm 10 pivots, the link shaft 13 may move to the maximum in the direction of the hinge shaft 11 along the link hole 15 as shown in E'. In this case, the opening angle of the door is 90°, and the damper 60 may be compressed to the maximum.

In the process of opening the door, the main links 40 may be moved linearly due to the movement of the arm 10, the damper 60 may be compressed by the movement of the rivet 31, and the link shaft 13 may be moved from one side portion of the link hole 15 to the other side portion, so that the door is smoothly opened with a small amount of force.

Next, when examining the closing operation of a door, the opening operation of the door described above may proceed in reverse. That is, in the open state of the door as shown in FIGS. 4*a* and 4*b*, a user may hold the door and apply a force to close the door and the arm 10 may pivot by the rotation of the door along the hinge shaft 11 as shown in FIGS. 3*a* and 3*b*.

In the open state of the door as shown in FIGS. 4*a* and 4*b*, the main links 40 may be moved to the other side portion as much as possible and as a result, the damper 60 and the main spring assembly 50 may be also moved to the other side portion while the rivet 31 is also moved to the other side portion as much as possible.

Herein, the link shaft 13 may be located close to the hinge shaft 11 as a pivot, that is, located at one end of the link hole 15 close to the hinge shaft 11, so there may be an effect that the user may easily close the door with a small amount of force.

Next, when the door is slowly closed as shown in FIGS. 3*a* and 3*b*, the main links 40 may be moved linearly to one direction by the pivoting of the arm 10 and as a result, the rivet 31 supporting the head 63 of the damper 60 may be moved to one direction, thereby releasing the compression force on the damper 60.

Subsequently, when the arm 10 pivots by the continuous closing motion of the door, the roller 67 of the damper 60 may rotate while in contact with the periphery of the arm 10, so the compression force may begin to be applied to the damper 60 and the door may begin to close smoothly.

Next, when the door is completely closed as shown in FIGS. 2*a* and 2*b*, the sub-spring assembly 70 may move along the periphery of the arm 10 by the pivoting of the arm 10 and then may be inserted into the dent portion 81, thereby supporting the door not to be opened due to the heat from high temperatures inside of the main body.

When the arm 10 is completely rotated and then is in a closed state, the main links 40 may be also moved linearly to the maximum and the roller 67 of the damper 60 may move along the periphery of the arm 10, so that the damper 60 is continuously compressed, allowing the door to be closed smoothly.

That is, in the process of closing a door, the roller 67 of the damper 60 may be moved due to the pivoting of the arm 10 while in contact with the periphery of the arm 10 and the head 63 of the damper 60 may be supported by the rivet 31, so that the compression force is continuously applied to the damper 60, and the door is gradually closed.

The above description is merely an exemplary description of the technical ideas of the present disclosure, and various modifications, changes, and substitutions may be made by those skilled in the art within the scope not departing from the essential characteristics of the present disclosure. As described above, the exemplary embodiments and accompanying drawings disclosed in the present disclosure are not intended to limit the technical idea of the present disclosure but are for illustrative purposes and the scope of the technical idea of the present disclosure is not limited by these exemplary embodiments and the accompanying drawings. The scope of protection of the present disclosure should be interpreted by the following claims, and all technical ideas within the equivalent scope should be interpreted as being included in the scope of the present disclosure.

What is claimed is:

1. A door hinge, comprising:

an arm installed on a door so as to pivot;

a housing installed on a main body of a mechanism in which the door is provided, the housing being connected to the arm by a hinge shaft and having a first and a second elongated openings provided in one end portion and a center portion thereof, respectively;

a damper casing connected to the arm by the hinge shaft inside the housing, the damper casing having a third and a fourth elongated openings provided in one end portion and the other end portion thereof respectively, and connected to the second opening in the third opening by a rivet, and having one surface supported by a support portion of the housing;

a pair of main links provided respectively on opposite sides of the damper casing inside the housing, the main links being connected to the arm by a link shaft, and having a fifth and a sixth openings provided in one end portion thereof, and being connected to the second and the third openings by the rivet in the sixth opening to linearly move;

a main spring assembly including a spring lever and a main spring sleeved onto the spring lever and being connected to the third and the fifth openings by a pin; and a damper provided inside the damper casing, one end of which is supported by the rivet, and the other end of which is connected to the fourth opening by a pin to move along a periphery of the arm, wherein the first opening of the housing is connected to one end portion of the main spring assembly by a pin, the third opening of the damper casing is connected to the second opening of the housing and the sixth opening of the main links by the rivet, and wherein when the door is opened, the main links move linearly and the damper is compressed by movement of the rivet, and when the door is closed, the periphery of the arm is in contact with the other end portion of the damper by pivoting of the arm so that the damper is compressed.

2. The door hinge of claim 1, wherein the arm further comprises a link hole into which the link shaft is inserted, and the link hole is formed in a long circular shape in an inward direction centering on the hinge shaft such that when the door is rotated, the link shaft moves along the link hole, and when the door is opened, the link shaft moves from one side portion to the other side portion of the link hole so that the door is smoothly opened, and when the door is closed, the link shaft moves from the other side portion to one side portion of the link hole so that the door is smoothly closed.

3. The door hinge of claim 1, wherein the damper comprises:

a body, a head supported by the rivet while moving in piston motion on one end portion of the body, a damper cover provided on the other end portion of the body, and a roller provided in the damper cover and configured to move along the periphery of the arm.

4. The door hinge of claim 3, wherein the arm has a cam profile that comprises a dent portion formed on the periphery of the arm in contact with the roller of the damper, a curved portion formed to be extended from the dent portion, and a flat portion formed to be extended from the curved portion.

5. The door hinge of claim 4, further comprising:

a sub-spring assembly that is provided inside the housing and is connected by a pin to a seventh opening provided on the other end portion of the housing to linearly move, with one end portion of the sub-spring assembly supported by a sub-support portion inside the housing, wherein the sub-spring assembly comprises a rod, a sub-spring inserted into the rod, and a sub-roller provided on the other end portion of the rod, and the sub-roller is inserted into the dent portion when the door is closed.

* * * * *